(12) United States Patent
Suzuki

(10) Patent No.: US 12,505,957 B2
(45) Date of Patent: Dec. 23, 2025

(54) METHOD FOR MANUFACTURING ELECTRICAL PRODUCT, AND ELECTRICAL PRODUCT

(71) Applicant: DENSO CORPORATION, Kariya (JP)

(72) Inventor: Yuki Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 313 days.

(21) Appl. No.: 18/174,875

(22) Filed: Feb. 27, 2023

(65) Prior Publication Data

US 2023/0223201 A1 Jul. 13, 2023

Related U.S. Application Data

(63) Continuation of application No. PCT/JP2021/032664, filed on Sep. 6, 2021.

(30) Foreign Application Priority Data

Oct. 8, 2020 (JP) .................. 2020-170638

(51) Int. Cl.
*H01G 4/40* (2006.01)
*B60L 50/51* (2019.01)
*H01G 2/02* (2006.01)
*H01G 4/228* (2006.01)
*H01G 13/00* (2013.01)
*H02M 7/48* (2007.01)

(52) U.S. Cl.
CPC .............. *H01G 4/40* (2013.01); *H01G 2/02* (2013.01); *H01G 4/228* (2013.01); *H01G 13/00* (2013.01); *B60L 50/51* (2019.02); *H02M 7/48* (2013.01)

(58) Field of Classification Search
CPC ............ H01G 4/40; H01G 2/02; H01G 4/228; H01G 13/00; B60L 50/51; H02M 7/48
USPC .............. 361/301.1, 301.5, 306.1, 308.1
See application file for complete search history.

(56) References Cited

U.S. PATENT DOCUMENTS

2017/0207027 A1* 7/2017 Sato .................. H01G 4/33

FOREIGN PATENT DOCUMENTS

| JP | 2010251400 A | * | 11/2010 |
| JP | 5391797 B2 | | 1/2014 |
| JP | 2018037433 A | * | 3/2018 |
| JP | 2018182075 A | * | 11/2018 |
| JP | 2019-097237 A | | 6/2019 |

* cited by examiner

*Primary Examiner* — Arun Ramaswamy
(74) *Attorney, Agent, or Firm* — Oliff PLC

(57) ABSTRACT

An electrical product including: an electrical component; a first power supply member and a second power supply member; and an insulating plate provided between the first power supply member and the second power supply member. The first power supply member is formed with a fixing hole which penetrates the first power supply member. The insulating plate is formed with a protrusion inserted into the fixing hole. The product is manufactured by preparing a jig with a recessed hole; placing the first power supply member on the jig; placing the insulating plate on the first power supply member so that the protrusion penetrates the fixing hole and the recessed hole.

4 Claims, 12 Drawing Sheets

METHOD FOR MANUFACTURING ELECTRICAL PRODUCT, AND ELECTRICAL PRODUCT

CROSS REFERENCE TO RELATED APPLICATIONS

The present application is a continuation application of International Patent Application No. PCT/JP2021/032664 filed on Sep. 6, 2021, which designated the U.S. and is based on and claims the benefit of priority from Japanese Patent Application No. 2020-170638 filed on Oct. 8, 2020, and the entire disclosure of the above application is incorporated herein by reference.

TECHNICAL FIELD

The disclosure described herein relates to a method for manufacturing an electrical product, and an electrical product.

BACKGROUND

An electrical product having a plurality of plate members requires highly accurate positioning of the plate members. For example, a capacitor for a power control device has a pair of conductive members and an insulating member between the conductive members. The conductive members may be required to provide a plurality of conductive connections at predetermined positions. For this purpose, the conductive members require highly accurate positioning control. In the above aspects, or in other aspects not mentioned, there is a need for further improvements in a method for manufacturing an electrical product, and an electrical product.

SUMMARY

A method for manufacturing an electrical product according to one aspect of the present disclosure includes: an electrical component; a first power supply member and a second power supply member fixed to the electrical component and extending in one direction; and an insulating plate provided between the first power supply member and the second power supply member in an orthogonal direction orthogonal to the one direction, wherein the first power supply member is formed with a fixing hole which penetrates a first power supply upper surface on a front side of the first power supply member and a first power supply lower surface on a back side of the first power supply member in the orthogonal direction, and wherein the insulating plate is formed with a protrusion inserted into the fixing hole, the method comprising: preparing a jig having a higher rigidity than the protrusion, and having a recessed hole locally recessed on an upper surface in the orthogonal direction; placing the first power supply member on the upper surface of the jig in a manner in which the fixing hole and the recessed hole are aligned in the orthogonal direction; placing the insulating plate on the first power supply member by passing the protrusion through each of the fixing hole and the recessed hole; placing the second power supply member on the insulating plate placed on the first power supply member; and sandwiching the insulating plate between the first power supply member and the second power supply member by fixing the first power supply member and the second power supply member to the electrical component.

Also, an electrical product according to one aspect of the present disclosure is an electrical product accommodated in a case together with a switch component including a plurality of switches, the electrical product comprising: an electrical component; a first power supply member and a second power supply member fixed to the electrical component and extending in one direction; and an insulating plate provided between the first power supply member and the second power supply member in an orthogonal direction orthogonal to the one direction, wherein the first power supply member is formed with a fixing hole which penetrates a first power supply upper surface on a front side of the first power supply member and a first power supply lower surface on a back side of the first power supply member in the orthogonal direction, and wherein a protrusion is formed on the insulating plate to extend in the orthogonal direction and is inserted into the fixing hole, and wherein a distal end of the protrusion passes through the fixing hole and is inserted into a recessed hole formed in the case to be recessed in the orthogonal direction.

According to this, an occurrence of misalignment between the two components is suppressed. For example, relative positional deviation between the first power supply member and the second power supply member is suppressed. Relative positional deviation between the switch component and the electrical product is suppressed.

BRIEF DESCRIPTION OF DRAWINGS

The disclosure is further described with reference to the accompanying drawings in which.

DETAILED DESCRIPTION

Figure 1:
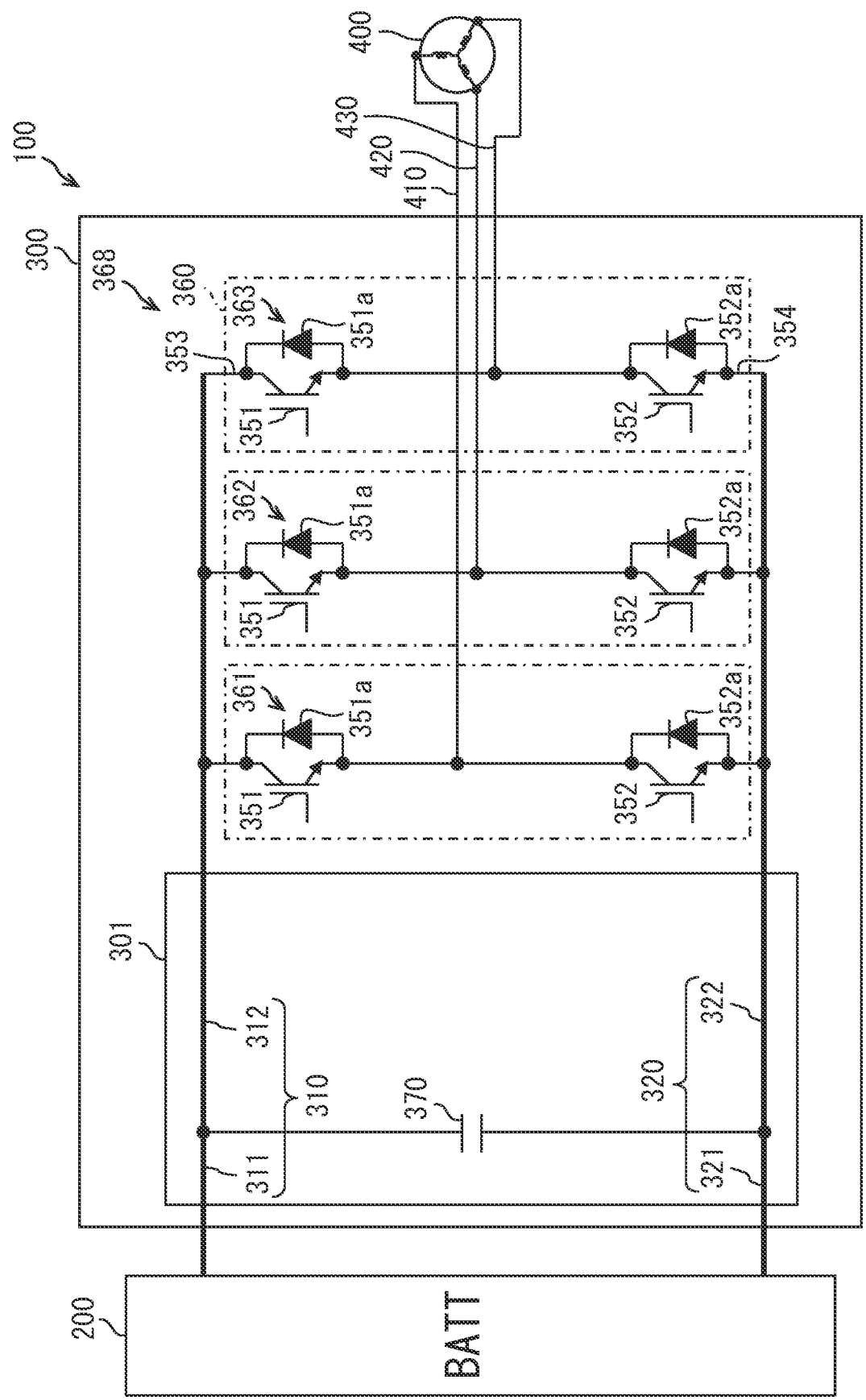
FIG. 1 is a circuit diagram for explaining an in-vehicle system.

JP5391797B describes a case mold type capacitor having a capacitor element, a pair of busbars, and an insulating plate. Each of the pair of busbars has an overlapping portion with an insulating plate interposed therebetween.

The insulating plate is made of resin or rubber. Therefore, the insulating plate may be easily deformed by contraction or the like. In connection with this, there is a possibility that a relative positional deviation may occur in the overlapping portion. Also, there is a risk of relative positional deviation between the case mold type capacitor and an external device.

It is an object of the present disclosure to provide a method for manufacturing an electrical product and an electrical product in which occurrence of positional deviation between two components is easily suppressed.

The following describe embodiments for carrying out the present disclosure with reference to the drawings. In each embodiment, parts corresponding to the elements described in the preceding embodiments are denoted by the same reference numerals, and redundant explanation may be omitted. When only a part of a configuration is described in an embodiment, the other preceding embodiments can be applied to the other parts of the configuration.

In addition, not only the combination between portions explicitly described that the combination is possible in each embodiment, but also partial combinations between the embodiments, between the embodiment and the modification, and between the modifications can be made if there is no problem in the combination in particular even when not explicitly described.

First Embodiment

First, an in-vehicle system 100 provided with an electric apparatus 300 including an electric product 301 is described with reference to FIG. 1. The in-vehicle system 100 is a system for an electric vehicle. The in-vehicle system 100 has a battery 200, an electric apparatus 300, a motor 400, and a board (not shown).

A plurality of ECUs are mounted on the board. The ECUs transmit signals to and receive signals from each other via a bus wiring. The ECUs control an electric vehicle in a cooperative manner. The regeneration and powering of the motor 400 according to a state of charge (SOC) of the battery 200 are controlled by the ECUs. The SOC is an abbreviation of state of charge. ECU is an abbreviation of electronic control unit.

The battery 200 includes a plurality of secondary batteries. The secondary batteries form a battery stack connected in series. The SOC of the battery stack corresponds to the SOC of the battery 200. As the secondary batteries, a lithium ion secondary battery, a nickel hydrogen secondary battery, an organic radical battery, or the like may be employed.

Electrical Apparatus

The electric apparatus 300 performs power conversion between the battery 200 and the motor 400 as an inverter. The electric apparatus 300 converts the DC power of the battery 200 into the AC power. The electrical apparatus 300 converts an AC power generated by a power generation, i.e., a regeneration of the motor 400 into a DC power.

The motor 400 is coupled with an output shaft of the electric vehicle which is not shown. The rotational energy of the motor 400 is transmitted to traveling wheels of the electric vehicle via the output shaft. On the contrary, the rotational energy of the traveling wheels is transmitted to the motor 400 via the output shaft.

The motor 400 is powered by the AC power supplied from the electrical apparatus 300. Accordingly, propulsive force is applied to the traveling wheels. Further, the motor 400 performs regeneration by the rotational energy transmitted from the traveling wheels. The AC power generated by this regeneration is converted into the DC power by the electrical apparatus 300. This DC power is supplied to the battery 200.

The DC power is also supplied to various electric loads mounted on the electric vehicle.

The electrical apparatus 300 includes semiconductor elements such as switches, which will be described later. In this embodiment, n-channel IGBTs are used as the switches. However, MOSFETs may be used instead of IGBTs for these switches. If the MOSFETs are used as the switches, the diode may be omitted.

These switches may be made from semiconductors such as Si and wide-gap semiconductors such as SiC. A material of semiconductor elements is not particularly limited.

Electrical Connection of Electrical Apparatus

The electrical apparatus 300 includes the electrical product 301 connected to the battery 200 via a first power supply busbar 310 and a second power supply busbar 320, a U-phase leg 361, a V-phase leg 362, and a W-phase leg 363 connected to the electrical product 301. The electrical product 301 has the first power supply busbar 310, the second power supply busbar 320 and a capacitor 370.

In FIG. 1, for convenience of description, a portion of the first power supply busbar 310 and a portion of the second power supply busbar 320 are shown within the frame showing the electrical product 301, but the electrical product 301 includes an entire of the first power supply busbar 310 and an entire of the second power supply busbar 320. The capacitor 370 corresponds to an electrical component.

The first power supply busbar 310 is connected to a positive electrode of the battery 200. The second power supply busbar 320 is connected to a negative electrode of the battery 200. The capacitor 370, the U-phase leg 361, the V-phase leg 361, and the W-phase leg 363 are connected between the first power supply busbar 310 and the second power supply busbar 320, respectively.

The capacitor 370 has two electrodes. One electrode of these two electrodes is connected to the first power supply busbar 310. The other one electrode of these two electrodes is connected to the second power supply busbar 320.

Each of the U-phase leg 361, the V-phase leg 362, and the W-phase leg 363 has two switches connected in series. Each of the U-phase leg 361, the V-phase leg 362, and the W-phase leg 363 has a high-side switch 351 and a low-side switch 352 as switches. Also, each of the U-phase leg 361, the V-phase leg 362, and the W-phase leg 363 has a high-side diode 351a and a low-side diode 352a as diodes. Each of the high side switch 351 and the low side switch 352 corresponds to a switch.

As shown in FIG. 1, collector electrodes of the high-side switches 351 are connected to the first power supply busbar 310. In each leg, an emitter electrode of the high-side switch 351 and a collector electrode of the low-side switch 352 are connected. Emitter electrodes of the low-side switches 352 are connected to the second power supply busbar 320. In this configuration, the high-side switch 351 and the low-side switch 352 are connected in series in an order from the first power supply busbar 310 to the second power supply busbar 320.

Further, in each leg, a cathode electrode of the high-side diode 351a is connected to the collector electrode of the high-side switch 351. In each leg, an anode electrode of the high-side diode 351a is connected to the emitter electrode of the high-side switch 351. In this configuration, the high-side diode 351a is connected to the high-side switch 351 in a reverse-parallel manner.

Similarly, in each leg, a cathode electrode of the low-side diode 352a is connected to the collector electrode of the low-side switch 352. In each leg, an anode electrode of the low-side diode 352a is connected to the emitter electrode of the low-side switch 352. In this configuration, the low-side diode 352a is connected to the low-side switch 352 in a reverse-parallel manner.

Furthermore, a U-phase busbar 410 is connected to a midpoint between the high-side switch 351 and the low-side switch 352 provided in the U-phase leg 361. The U-phase busbar 410 is connected to a U-phase stator coil of the motor 400.

A V-phase busbar 420 is connected to a midpoint between the high-side switch 351 and the low-side switch 352 of the V-phase leg 362. The V-phase busbar 420 is connected to a V-phase stator coil of the motor 400.

A W-phase busbar 430 is connected to a midpoint between the high-side switch 351 and the low-side switch 352 of the W-phase leg 363. The W-phase busbar 430 is connected to a W-phase stator coil of the motor 400.

If the motor 400 is powered, all of the high-side switches 351 and the low-side switches 352 provided in the U-phase leg 361, the V-phase leg 362, and the W-phase leg 363 are PWM-controlled by the control signal from the ECU. Thereby, a three-phase alternating current is generated in the electric apparatus 300. If the motor 400 generates (i.e., regenerates) electricity, the ECU stops an output of the control signal, for example. As a result, the AC power generated by the power generation of the motor 400 passes through the U-phase leg 361, the V-phase leg 362, and the W-phase leg 363. As a result, the AC power and the DC power are converted in both directions.

Mechanical Configuration of Electrical Products

Next, the mechanical configuration of the electrical product 301 is described. Three directions orthogonal to one another are referred to as an x-direction, a y-direction, and a z-direction. The x-direction corresponds to an aligned direction. The y-direction corresponds to a one direction. The z-direction corresponds to the orthogonal direction. In the drawings, the word "direction" is omitted. In the drawings, the battery 200 is abbreviated as "BATT".

The electrical product 301 has the first power supply busbar 310, the second power supply busbar 320, and the capacitor 370 as the components described so far. The electrical product 301 has an insulating plate 340 and a capacitor case 371 in addition to the components described above. Note that the capacitor 370 has a substantially rectangular parallelepiped shape as shown in FIGS. 7 and 8.

First Power Supply Busbar

The first power supply busbar 310 has a first conductive portion 311 which connects the battery 200 and the capacitor 370, and a second conductive portion 312 which connects the capacitor 370 and the U-phase leg 361, the V-phase leg 362, and the W-phase leg 363, respectively. The second conductive portion 312 corresponds to a second power supply member.

Figure 5:
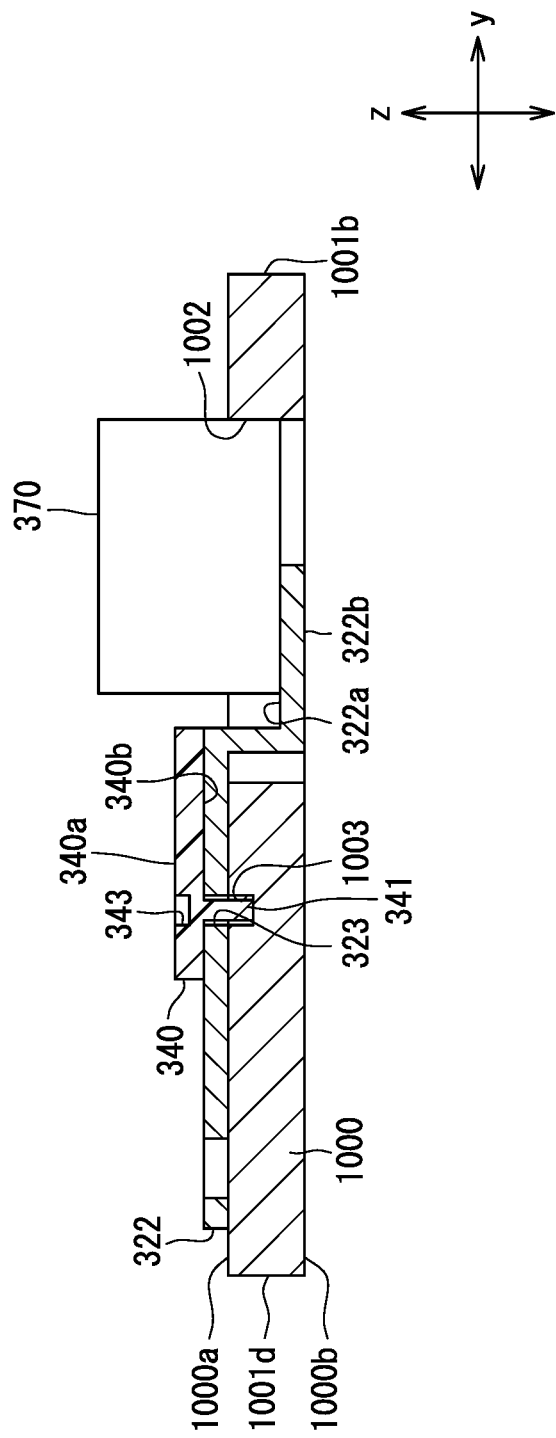
FIG. 5 is a cross-sectional view for explaining a method for manufacturing an electrical product.
Figure 6:
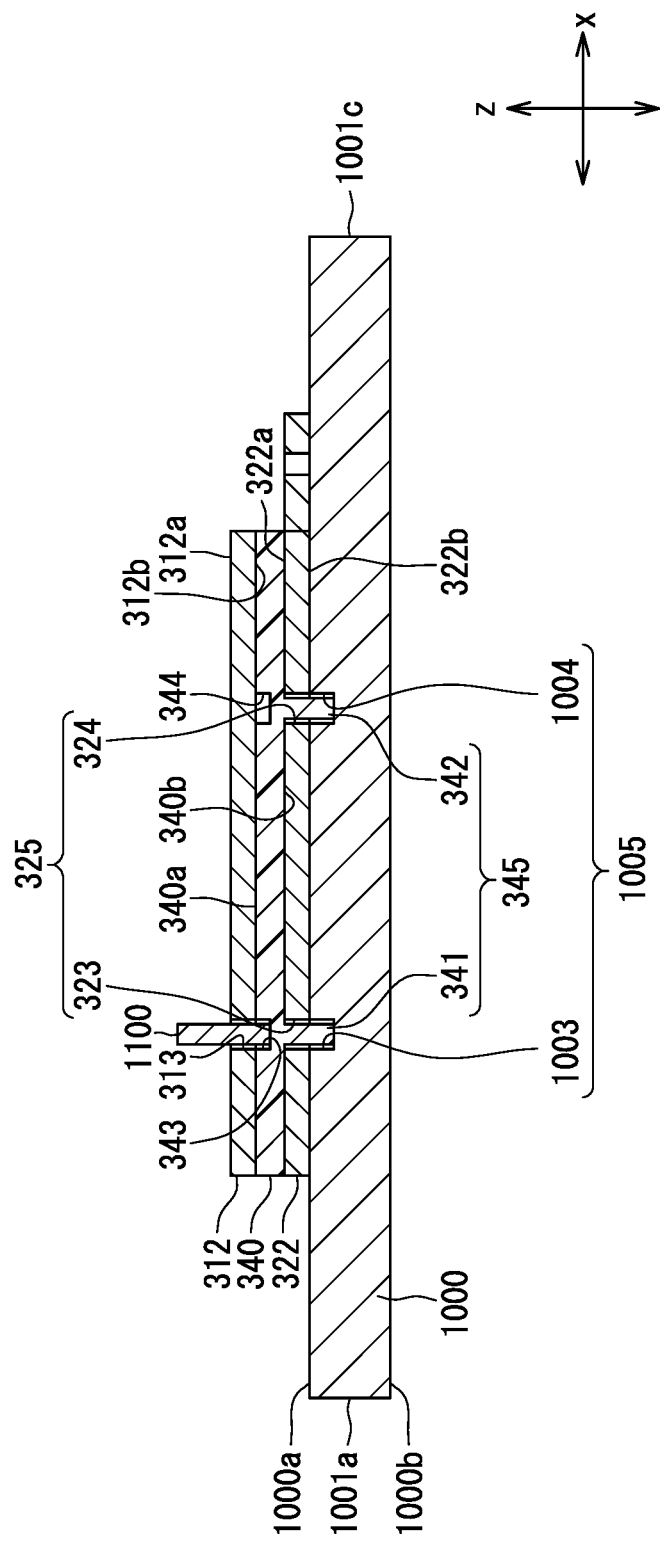
FIG. 6 is a cross-sectional view for explaining a method for manufacturing an electrical product along a line VI-VI shown in FIG. 2.
Figure 7:
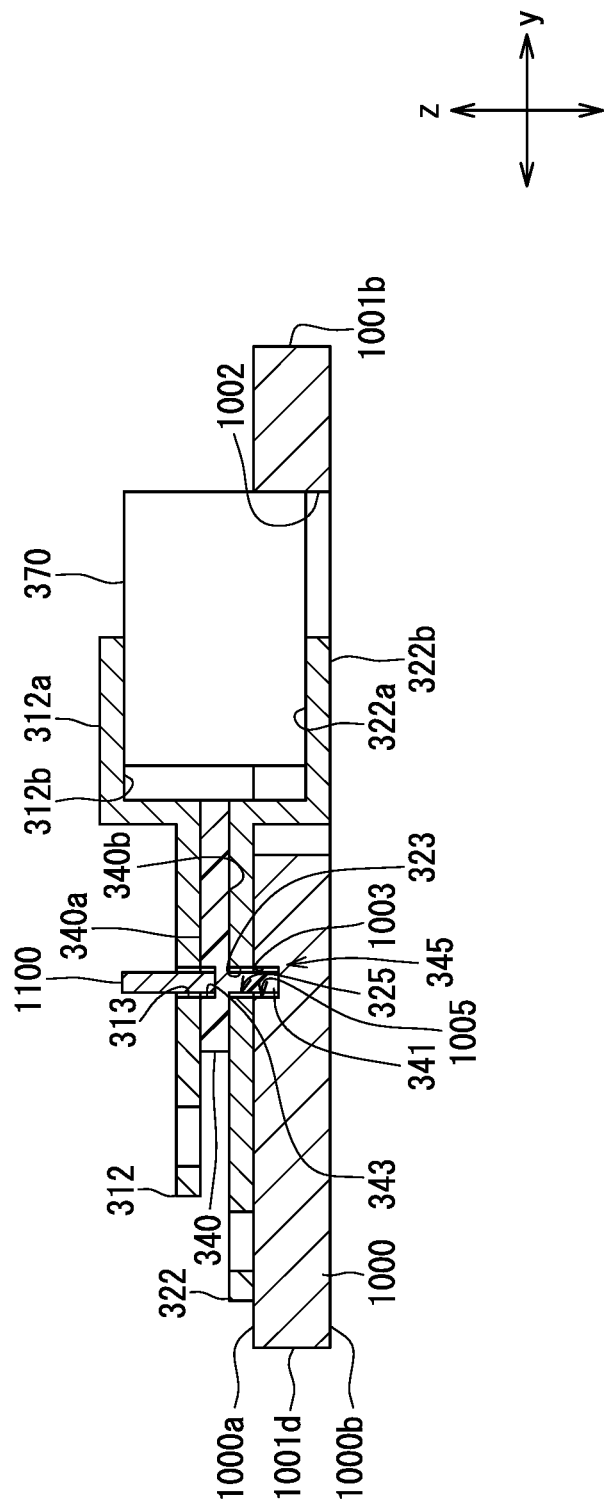
FIG. 7 is a cross-sectional view for explaining a method for manufacturing an electrical product along a line VII-VII shown in FIG. 2.
Figure 8:
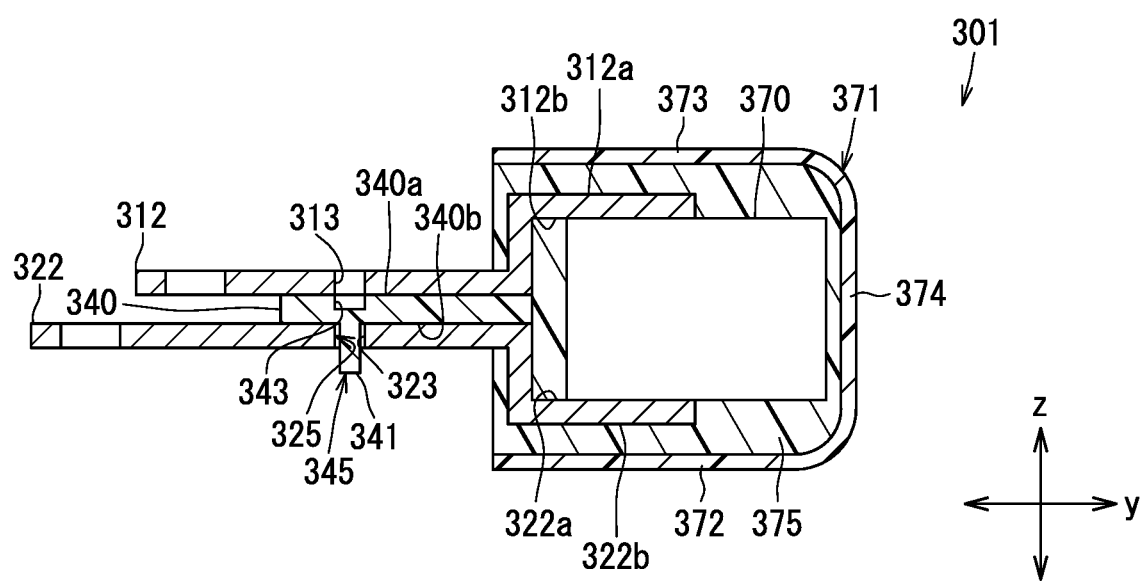
FIG. 8 is a cross-sectional view for explaining an electrical product.

As shown in FIGS. 6 to 8, the second conductive portion 312 has a flat shape with a thin thickness in the z-direction. The second conductive portion 312 has a first busbar upper surface 312a and a first busbar lower surface 312b on the back side of the first busbar upper surface 312a aligned in the z-direction. In addition, as shown in FIGS. 6 to 8, the second conductive portion 312 is formed with a positioning hole 313 which opens in a cylindrical shape on the first busbar upper surface 312a and the first busbar lower surface 312b. In FIGS. 2 to 8, the first conductive portion 311 is not illustrated. Note that the first busbar upper surface 312a corresponds to a second power supply upper surface. The first busbar bottom surface 312b corresponds to a second power supply bottom surface.

Second Power Supply Busbar

The second power supply busbar 320 has a third conductive portion 321 which connects the battery 200 and the capacitor 370, and a fourth conductive portion 322 which connects the capacitor 370 and the U-phase leg 361, the V-phase leg 362, and the W-phase leg 363, respectively. The fourth conductive portion 322 corresponds to a first power supply member.

As shown in FIGS. 6 to 8, the fourth conductive portion 322 has a flat shape with a thin thickness in the z-direction. The fourth conductive portion 322 has a second busbar upper surface 322a and a second busbar lower surface 322b on the back side of the second busbar upper surface 322a aligned in the z-direction. Further, as shown in FIGS. 6 and 7, the fourth conductive portion 322 is formed with a first fixing hole 323 and a second fixing hole 324 which are cylindrically opened in the second busbar upper surface 322a and the second busbar lower surface 322b. Note that the second busbar upper surface 322a corresponds to a first power supply upper surface. The second busbar bottom surface 322b corresponds to a first power supply bottom surface.

As shown in FIGS. 3 to 8, the first fixing hole 323 and the second fixing hole 324 are aligned to be spaced apart in the x-direction. In FIGS. 2 to 7, the third conductive portion 321 is not illustrated.

Condenser Case

The capacitor case 371 is a housing for accommodating the capacitor 370. As shown in FIG. 8, the capacitor case 371 has a lower case portion 372 and an upper case portion 373 aligned in the z-direction, and a case connecting portion 374 connecting them. The capacitor 370 is accommodated in a case space defined by a case lower portion 372, a case upper portion 373 and a case connecting portion 374. The second conductive portion 312 is connected to one of the two electrodes of the capacitor 370. The fourth conductive portion 322 is connected to the other one of the two electrodes of the capacitor 370. Note that the capacitor case 371 corresponds to an electrical component case.

Insulating Plate

As shown in FIGS. 4 to 8, the insulating plate 340 has a flat shape with a thin thickness in the z-direction. The insulating plate 340 is made of resin. The insulating plate 340 is provided between the second conductive portion 312 and the fourth conductive portion 322 and functions a role of preventing a current flow between the second conductive portion 312 and the fourth conductive portion 322.

The insulating plate 340 has an insulating plate upper surface 340a and an insulating plate lower surface 340b aligned in the z-direction. The insulating plate 340 has a first protrusion 341 and a second protrusion 342 which are formed in a cylindrical shape and extend in a manner away from the insulating plate lower surface 340b in the z-direction.

As shown in FIGS. 4 to 8, the first protrusion 341 and the second protrusion 342 are aligned to be spaced apart in the x-direction. Note that the first protrusion 341 and the second protrusion 342 may not be connected to the insulating plate 340. The first protrusion 341 and the second protrusion 342 may be separated from the insulating plate 340. The first protrusion 341 and the second protrusion 342 may be connected to the insulating plate 340.

The insulating plate 340 is thicker at portions where the first protrusion 341 and the second protrusion 342 are formed in comparison with portions where the first protrusion 341 and the second protrusion 342 are not formed in the insulating plate 340. Therefore, the portions of the insulating plate 340 where the first protrusion 341 and the second protrusion 342 are formed is more likely to accumulate heat than the portions where the first protrusion 341 and the second protrusion 342 are not formed. The insulating plate 340 is likely to accumulate heat locally.

In order to release this accumulated heat, a first concaved portion 343 is intentionally formed in a cylindrically concaved manner from the insulating plate upper surface 340a toward the insulating plate lower surface 340b within an area where the first protrusion 341 is imaginary projected onto the insulating plate 340 in the z-direction. Similarly, a second concaved portion 344 is intentionally formed in a cylindrically concaved manner from the insulating plate upper surface 340a toward the insulating plate lower surface 340b within an area where the second protrusion 342 is imaginary projected onto the insulating plate 340 in the z-direction. The first concaved portion 343 corresponds to a concaved portion.

Note that the first concaved portion 343 may not be formed within an area where the first protrusion 341 is imaginary projected onto the insulating plate 340 in the z-direction. Similarly, the second concaved portion 344 may not be formed within an area where the second protrusion 342 is imaginary projected onto the insulating plate 340 in the z-direction.

The lengths of the first concaved portion 343 along the x-direction and the y-direction are the same as the lengths of the positioning hole 313 along the x-direction and the y-direction.

Method for Manufacturing Electrical Product

A method for manufacturing the electrical product 301 is described with reference to FIGS. 2 to 8.

First, a jig 1000 for regulating a position of the fourth conductive portion 322 in the x-direction and the y-direction is prepared.

The jig 1000 is made of a highly rigid material such as metal. Note that the jig 1000 has a higher rigidity than the first protrusion 341 and the second protrusion 342 described above.

The jig 1000 has a substantially rectangular parallelepiped shape. The jig 1000 has an upper surface 1000a and a lower surface 1000b aligned to be spaced apart in the z-direction, and a connecting surface 1001 connecting them.

Figure 2:
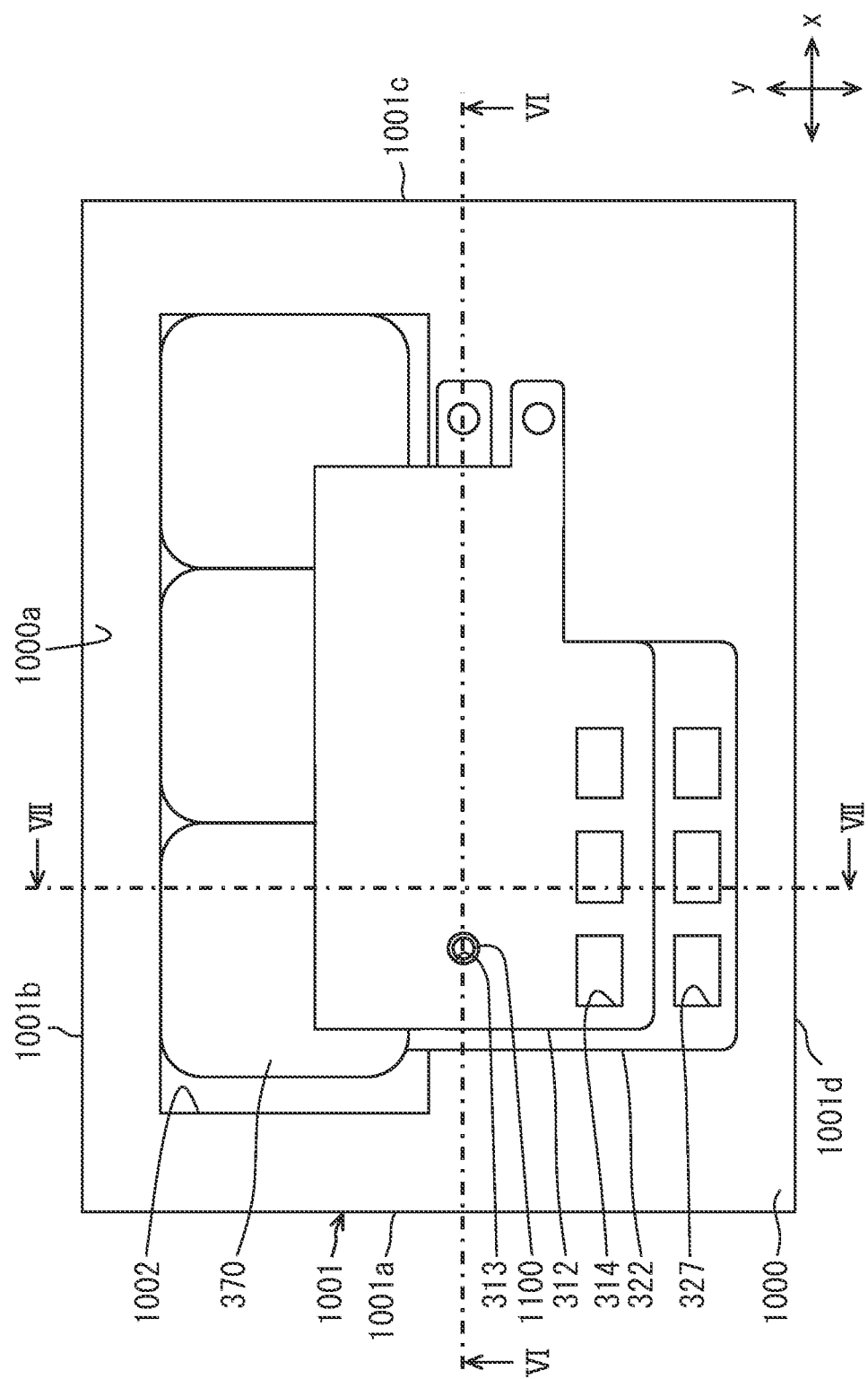
FIG. 2 is a top view for explaining a method for manufacturing an electrical product.

As shown in FIG. 2, the connecting surfaces 1001 include a first connecting surface 1001a and a third connecting surface 1001c aligned to be spaced apart in the x-direction, and a second connecting surface 1001b and a fourth connecting surface 1001d aligned to be spaced apart in the y-direction. The first connecting surface 1001a, the second connecting surface 1001b, the third connecting surface 1001c, and the fourth connecting surface 1001d are annularly connected in a clockwise circumferential direction around the z-direction.

Figure 3:
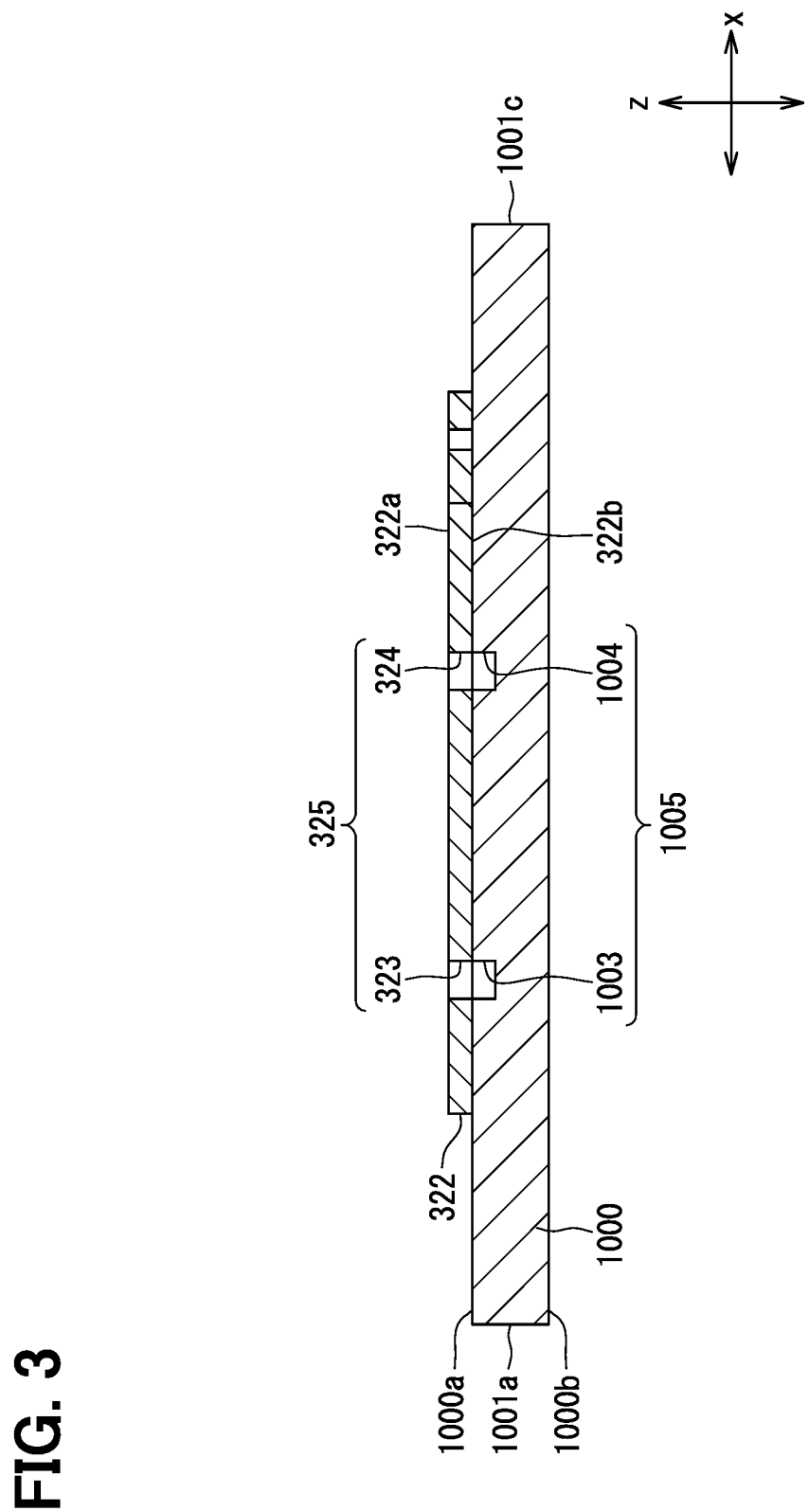
FIG. 3 is a cross-sectional view for explaining a method for manufacturing an electrical product.

As shown in FIG. 2, a through hole 1002 is formed on a side to the second connecting surface 1001b of the jig 1000 so as to penetrate the lower surface 1000b and the upper surface 1000a. As shown in FIG. 3, a first recessed hole 1003 and a second recessed hole 1004 recessed toward the lower surface 1000b are formed on the upper surface 1000a positioned closer to the fourth connecting surface 1001d than the through hole 1002 of the jig 1000.

As shown in FIGS. 3 to 8, the first recessed hole 1003 is provided on a side to the first connecting surface 1001a. A second recessed hole 1004 is provided on a side to the third connecting surface 1001c. The first recessed hole 1003 and the second recessed hole 1004 are aligned to be spaced apart in the x-direction.

The lengths of the first recessed hole 1003 along the x-direction and the y-direction are the same as the lengths of the fixing hole 323 along the x-direction and the y-direction. The lengths of the first recessed hole 1004 along the x-direction and the y-direction are the same as the lengths of the second fixing hole 324 along the x-direction and the y-direction.

Hereinafter, the first fixing hole 323 and the second fixing hole 324 are collectively referred to as a fixing hole 325 for the sake of simplicity of explanation. The first recessed hole 1003 and the second recessed hole 1004 are collectively referred to as a recessed hole 1005. The first protrusion 341 and the second protrusion 342 are collectively indicated as a protrusion 345.

Next, as shown in FIG. 3, the fourth conductive portion 322 is arranged on the upper surface 1000a of the jig 1000 so that the fixing hole 325 communicates with the recessed hole 1005 in the z-direction. Specifically, the fourth conductive portion 322 is arranged on the upper surface 1000a of the jig 1000 so that the first fixing hole 323 communicates with the first recessed hole 1003 in the z-direction. The fourth conductive portion 322 is arranged on the upper surface 1000a of the jig 1000 so that the second fixing hole 324 communicates with the second recessed hole 1004 in the z-direction.

As shown in FIG. 5, the fourth conductive portion 322 extends in the y-direction from the fourth connecting surface 1001d toward the end of the through hole 1002 on a side to the fourth connecting surface 1001d. After that, the fourth conductive portion 322 extends in the z-direction along a wall surface defining the through hole 1002 toward the lower surface 1000b. The fourth conductive portion 322 extended to the lower surface 1000b extends in the y-direction through a hollow of the through hole 1002 toward the second connecting surface 1001b.

Figure 4:
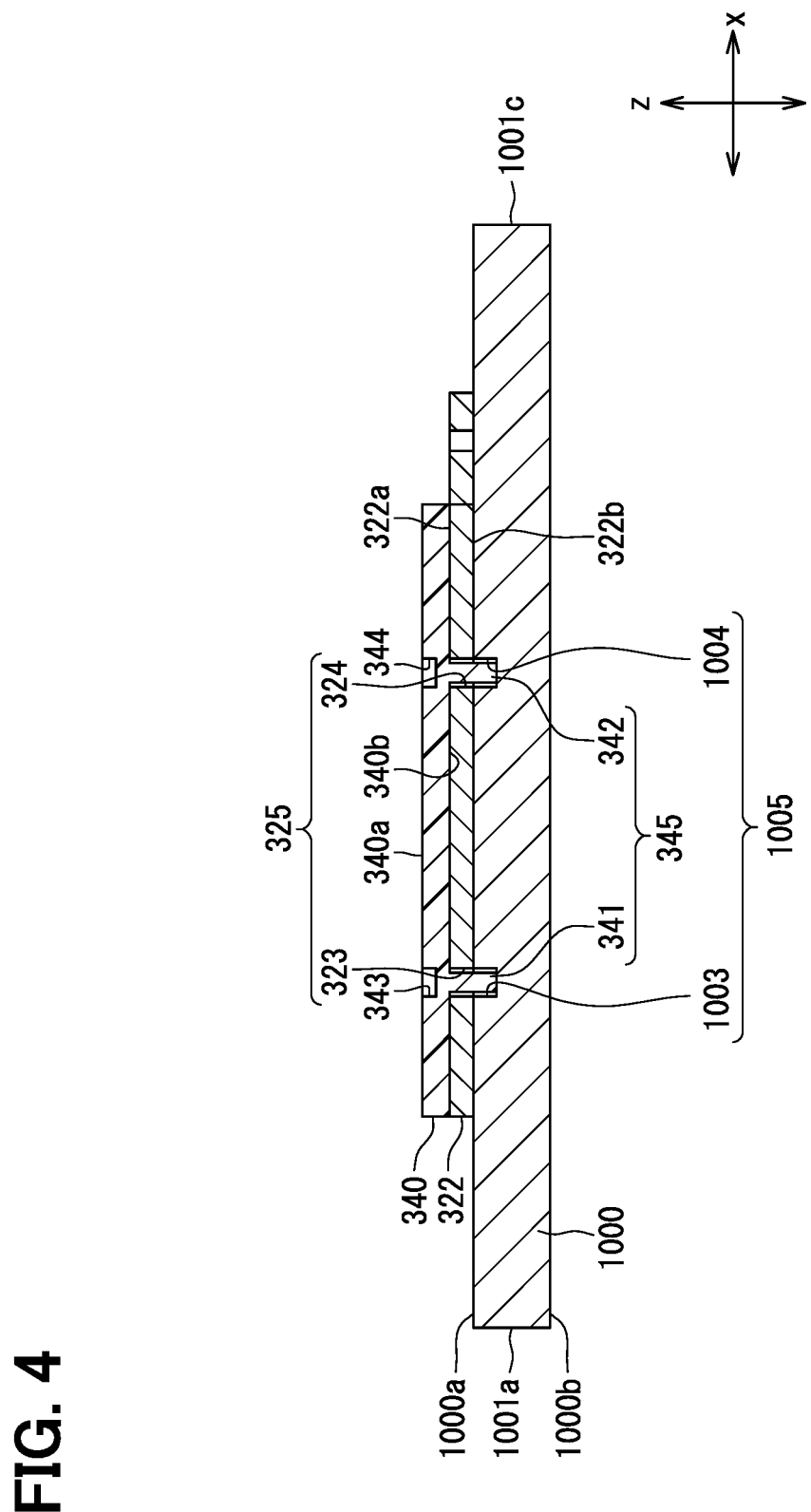
FIG. 4 is a cross-sectional view for explaining a method for manufacturing an electrical product.

Next, as shown in FIG. 4, the insulating plate 340 is arranged on the second busbar upper surface 322a of the fourth conductive portion 322 so that the protrusions 345 pass through the fixing hole 325 and the recessed hole 1005, respectively. Specifically, the insulating plate 340 is arranged on the second upper surface 320a of the fourth conductive portion 322 so that the first protrusion 341 passes through the first fixing hole 323 and the first recessed hole 1003 respectively. The insulating plate 340 is arranged on the second upper surface 320a of the fourth conductive portion 322 so that the second protrusion 342 passes through the second fixing hole 324 and the second recessed hole 1004 respectively. This regulates the position of the fourth conductive portion 322 with respect to the jig 1000 in the x-direction and the y-direction.

Note that the jig 1000 has higher rigidity than the protrusion 345 as described above. The deformation of the insulating plate 340 in the x-direction, the y-direction, and the z-direction is corrected by inserting the protrusion 345 into the recessed hole 1005.

Next, as shown in FIG. 5, the capacitor 370 is inserted into the hollow of the through hole 1002 of the jig 1000. The capacitor 370 is disposed on the fourth conductive portion 322 extending through the hollow of the through hole 1002 toward the second connecting surface 1001b. Note that the capacitor 370 may be fixed by the jig 1000.

Next, as shown in FIG. 6, the second conductive portion 312 is arranged on the insulating plate upper surface 340a of the insulating plate 340 so that the positioning hole 313 and the first concaved portion 343 communicate in the z-direction.

Next, a positioning pin 1100, which is formed in a cylindrical shape and extends in the z-direction, is prepared. The positioning pin 1100 is passed through the positioning hole 313 and the first concaved portion 343 respectively. The lengths of the positioning pin 1100 extending along the x-direction and the y-direction are the same as the lengths of the positioning hole 313 and the first concaved portion 343 extending along the x-direction and the y-direction. The position of the second conductive portion 312 with respect to the insulating plate 340 in the x-direction and the y-direction is regulated by inserting the positioning pin 1100 into the positioning hole 313 and the first concaved portion 343. The positioning pin 1100 corresponds to an auxiliary jig.

As shown in FIG. 7, the second conductive portion 312 extends in the y-direction from the fourth connecting surface 1001d toward the end of the through hole 1002 on a side to the fourth connecting surface 1001d. After that, the second conductive portion 312 extends in the z-direction along the side surface of the capacitor 370 in a manner spaced apart from the upper surface 1000a. The second conductive portion 312 extending in the z-direction in a manner spaced apart from the upper surface 1000a extends in the y-direction toward one of the two electrodes of the capacitor 370.

Next, the second conductive portion 312 and the fourth conductive portion 322 are fixed by a clamp (not shown). In this state, one of the two electrodes of the capacitor 370 is connected to the second conductive portion 312 by welding or the like. Similarly, the other one of the two electrodes of the capacitor 370 is connected to the fourth conductive portion 322 by welding or the like. After that, the positioning pin 1100 is removed from the electrical product 301. Then, the electrical product 301 is remove from the jig 1000.

The electrical product 301 removed from the jig 1000 is accommodated in the capacitor case 371 described above. As shown in FIG. 8, the capacitor 370, a part of the second conductive portion 312, a part of the fourth conductive portion 322, and a part of the insulating plate 340 are accommodated in the capacitor case 371, respectively. A remaining part of the second conductive portion 312, a remaining part of the fourth conductive portion 322, and a remaining part of the insulating plate 340 are exposed from the capacitor case 371.

Finally, the capacitor case 371 is filled with the coating resin 375 and solidified. Thereby, the capacitor 370, the second conductive portion 312, the fourth conductive portion 322 and the insulating plate 340 are fixed to the capacitor case 371. The insulating plate 340 is sandwiched between the second conductive portion 312 and the fourth conductive portion 322.

As shown in FIG. 8, the protrusion 345 formed on the insulating plate 340 is exposed from the fixing hole 325 formed in the fourth conductive portion 322 exposed from the capacitor case 371.

Configuration of Electrical Apparatus

The electric apparatus 300 has the electric product 301 and the U-phase leg 361, the V-phase leg 362 and the W-phase leg 363 as components described so far.

As shown in FIG. 1, collector terminals 353 are connected to the collector electrodes of the high-side switches 351 provided in the U-phase leg 361, the V-phase leg 362 and the W-phase leg 363, respectively. Emitter terminals 354 are connected to the emitter electrodes of the low-side switches 352 provided in the U-phase leg 361, the V-phase leg 362 and the W-phase leg 363. Connection terminals (not shown) are connected to the middle points of the high-side switches 351 and the low-side switches 352 of the U-phase leg 361, the V-phase leg 362 and the W-phase leg 363. Gate terminals (not shown) are connected to the gate electrodes of the high-side switches 351 and the low-side switches 352 provided in the U-phase leg 361, the V-phase leg 362 and the W-phase leg 363.

The U-phase leg 361, the V-phase leg 362 and the W-phase leg 363, the collector terminals 353, the emitter terminals 354, connection terminals (not shown), and gate terminals are resin-sealed with a resin member 360 to form switch modules 368.

Moreover, the electrical apparatus 300 has a cooling device 364 and a case 380 in addition to the components described above.

Cooling Device

Figure 11:
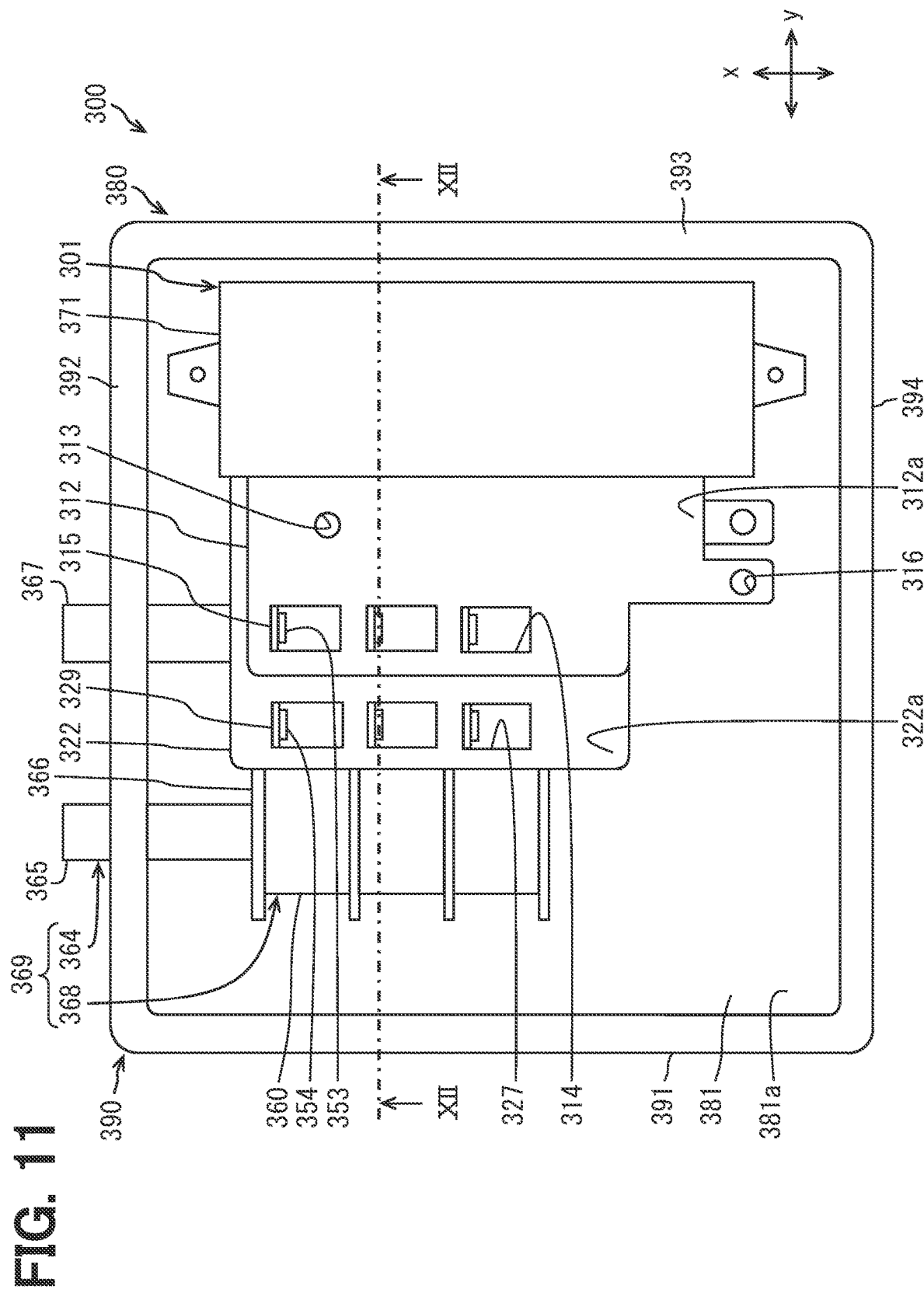
FIG. 11 is a top view for explaining an electrical apparatus.

As shown in FIG. 11, the cooling device 364 has a supply pipe 365, a discharge pipe 367, and a plurality of relay pipes 366. The supply pipe 365 and the discharge pipe 367 are connected via a plurality of relay pipes 366. Refrigerant is supplied to the supply pipe 365. The refrigerant flows from the supply pipe 365 to the discharge pipe 367 via a plurality of relay pipes 366.

The supply pipe 365 and the discharge pipe 367 extend in the x-direction. The supply pipe 365 and the discharge pipe 367 are aligned to be spaced apart in the y-direction. Each of the relay pipes 366 extends from the supply pipe 365 toward the discharge pipe 367 along the y-direction. A plurality of relay pipes 366 are aligned to be spaced apart in the x-direction.

A gap is formed between two adjacently aligned relay pipes 366 among the plurality of relay pipes 366 aligned to be spaced apart in the x-direction. A total of three air gaps are configured in the cooling device 364. The switch modules 368 for three phases are individually provided for each of these three air gaps. The above configuration forms the power module 369. The power module 369 corresponds to a switch component.

Case

Figure 12:
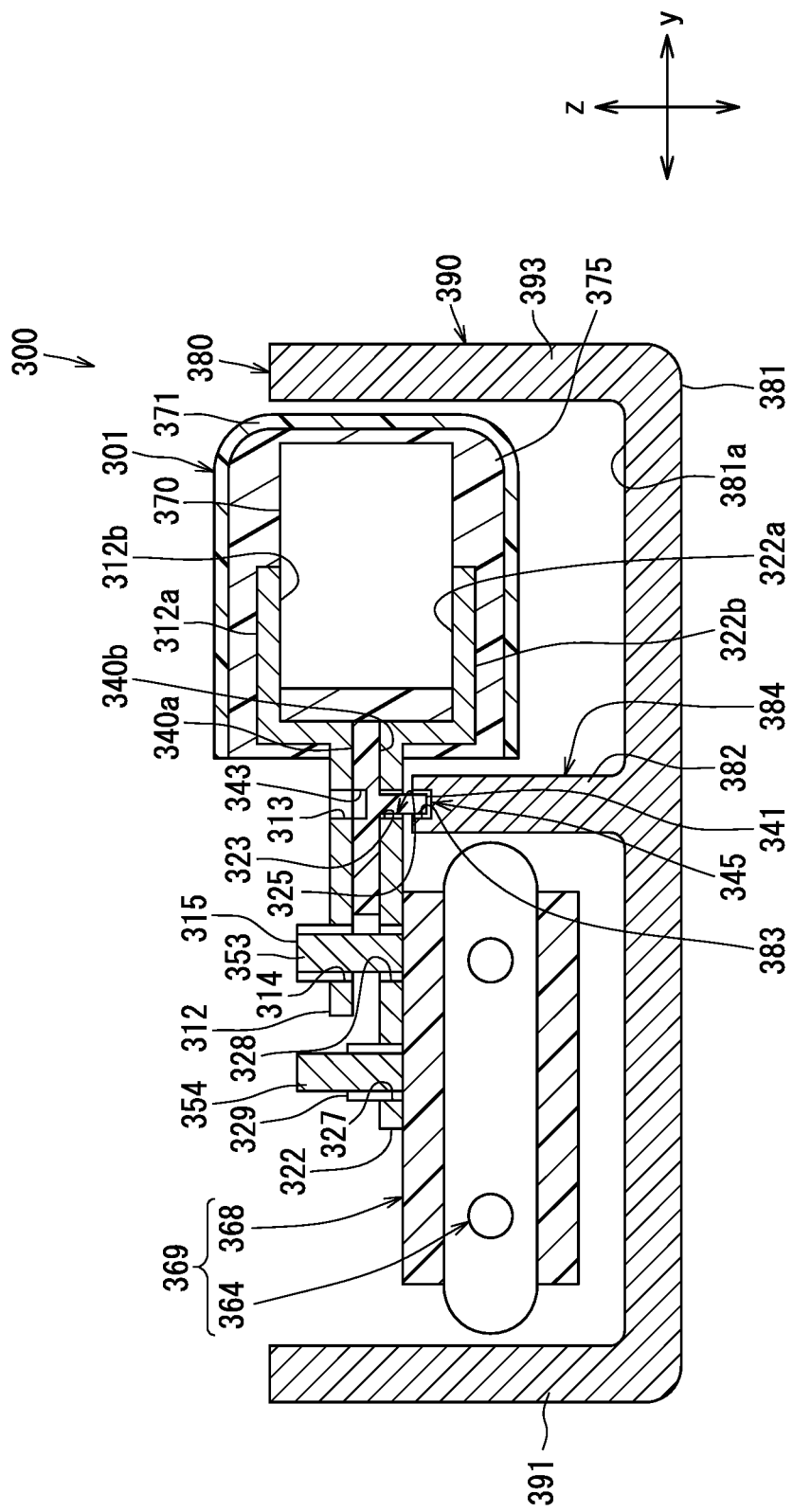
FIG. 12 is a cross-sectional view of the electrical apparatus along a line XII-XII shown in FIG. 11.

As shown in FIGS. 11 and 12, the case 380 has a bottom portion 381 which is thin in the z-direction, and a side wall portion 390 annularly rising from an inner bottom surface 381a of the bottom portion 381 in the z-direction.

The sidewall portion 390 has a first sidewall 391 and a third sidewall 393 aligned to be spaced apart from each other in the y-direction, and a second sidewall 392 and a fourth sidewall 394 aligned to be spaced apart from each other in the x-direction. The first side wall 391, the second side wall 392, the third side wall 393, and the fourth side wall 394 are annularly connected in the circumferential direction around the z-direction.

Therefore, a storage space is formed between the bottom portion 381 and the side wall portion 390 of the case 380. The power module 369 and the electrical product 301 are stored in this storage space.

Storage Configuration of Case

As shown in FIGS. 11 and 12, the power module 369 is accommodated in the housing space on a side to the first side wall 391 of the case 380. The electrical product 301 is stored in the storage space on a side to the third side wall 393 of the case 380.

The power module 369 is fixed to the bottom portion 381 with bolts (not shown) or the like. Each of the switch modules 368 for the three-phases provided in the power module 369 has the collector terminal 353 and the emitter terminal 354 extending in a manner away from the bottom portion 381 in the z-direction. Note that the power module 369 does not have to be fixed to the bottom portion 381. The power module 369 may be fixed to case 380.

Similarly, the electrical product 301 is fixed to the bottom portion 381 by bolts (not shown). The capacitor case 371 is fixed to the bottom portion 381 by bolts (not shown) or the like. The second conductive portion 312, the fourth conductive portion 322, and the insulating plate 340 described above extend from the capacitor case 371 toward the power module 369 in the y direction.

As shown in FIGS. 11 and 12, the second conductive portion 312 is formed with three first through holes 314 which open on the first busbar upper surface 312a and the first busbar lower surface 312b. The three first through holes 314 are aligned to be spaced apart in the x-direction. Those three first through holes 314 are formed with first terminals 315 extending in a manner away from the bottom portion 381 in the z-direction from edges on sides of the second side wall 392 of the three first through holes 314, respectively. The first terminal 315 corresponds to an external connection terminal.

In addition, the three first terminals 315 are aligned to be spaced apart from the positioning hole 313 described above in the y-direction. The positioning hole 313 is located between the first terminal 315 located closest to the second side wall 392 among the three first terminals 315 and the adjacent first terminal 315 in the x-direction.

Similarly, as shown in FIGS. 11 and 12, the fourth conductive portion 322 has three second through-holes 327 and three third through-holes 328 which are open on the second busbar upper surface 322a and the second busbar lower surface 322b. The three second through holes 327 are aligned to be spaced apart in the x-direction. The three third through holes 328 are aligned to be spaced apart in the x-direction.

Also, the three second through holes 327 are formed on a side to the first side wall 391 of the fourth conductive portion 322 as shown in FIG. 12. The three third through holes 328 are formed on a side to the third side wall 393 of the fourth conductive portion 322 as shown in FIG. 12. The three third through holes 328 are aligned in a manner to communicate with the three first through holes 314 in the z-direction.

Those three second through holes 327 are formed with second terminals 329 extending in a manner away from the bottom portion 381 in the z-direction from edges on sides to the second side wall 392 of the three second through holes 327, respectively.

Further, the collector terminals 353 are exposed from communication holes, respectively. The communication holes are formed to arrange the three first communication holes 314 and the three third communication holes 328 in a communicating manner in the z-direction, respectively. The collector terminals 353 exposed from the three communication holes are connected to the first terminals 315 formed on the edges of the three first communication holes 314 by welding or the like, respectively.

Similarly, the emitter terminals 354 are exposed from the three second through holes 327. The emitter terminals 354 exposed from the three second communication holes 327 are connected to the second terminals 329 formed on the edges of the three second communication holes 327 by welding or the like, respectively.

Further, as shown in FIG. 12, the bottom portion 381 is formed with an extension portion 384 extending toward the second conductive portion 312 and the fourth conductive portion 322 connecting the capacitor 370 and the power module 369 in a manner away from the inner bottom surface 381a in the z-direction.

The extension portion 384 has a first extension portion 382 and a second extension portion (not shown). The first extension portion 382 is formed on the inner bottom surface 381a of the bottom portion 381 on a side to the second side wall 392. The second extension portion is formed on the inner bottom surface 381a of the bottom portion 381 on a side to the fourth side wall 394.

As shown in FIG. 12, the first extension portion 382 is provided between the power module 369 and the capacitor case 371 in the y-direction. The first extension portion 382 is aligned to face the power module 369 and the capacitor 370 in the y-direction. Further, the first extension portion 382 is formed with a recessed hole 383 recessed from a distal end spaced from the bottom portion 381 toward the bottom portion 381.

Although not shown, a second extension portion is also provided between the power module 369 and the capacitor case 371 in the y-direction. The second extension portion is aligned in the y-direction to face the power module 369 and the capacitor 370. Further, the second extension portion is formed with a recessed hole 383 recessed from a distal end spaced from the bottom portion 381 toward the bottom portion 381.

As described above, the protrusion 345 formed on the insulating plate 340 is exposed from the fixing hole 325. As shown in FIG. 12, the protrusion 345 extends toward extension portion 384 provided between the capacitor 370 and the power module 369. The protrusion 345 is inserted into the recessed hole 383 of the extension portion 384.

Specifically, the first protrusion 341 exposed from the first fixing hole 323 is inserted into the recessed hole 383 of the first extension portion 382. The second protrusion 342 exposed from the second fixing hole 324 is inserted into the recessed hole 383 of the second extension portion. Thereby, the electrical product 301 is fixed to the first extension portion 382 and the second extension portion respectively.

Operations and Advantages

As described above, in the manufacturing process, the insulating plate 340 is arranged on the second busbar upper surface 322a of the fourth conductive portion 322 so that the protrusion 345 passes through the fixing hole 325 and the recessed hole 1005, respectively. This regulates the position of the fourth conductive portion 322 with respect to the jig 1000 in the x-direction and the y-direction. The deformation of the insulating plate 340 in the x-direction, the y-direction, and the z-direction is corrected by inserting the protrusion 345 into the recessed hole 1005.

Next, the second conductive portion 312 is arranged on the insulating plate upper surface 340a of the insulating plate 340 which is corrected. In this state, the second conductive portion 312 and the fourth conductive portion 322 are fixed to the capacitor 370. The insulating plate 340 corrected by this is sandwiched between the first power supply busbar 310 and the second power supply busbar 320.

Therefore, relative positional displacement between the second conductive portion 312 and the fourth conductive portion 322 is easily suppressed. As a result, it is possible to easily suppress relative positional deviations among the terminals of the power supply busbar comprising the first terminals 315 and the second terminals 329 and the terminals of the power modules 369 comprising the collector terminals 353 to be connected to the first terminals 315 and the emitter terminals 354 to be connected to the second terminals 329. The first power supply busbar 310 and the second power supply busbar 320 are collectively referred to as a power supply busbar.

Furthermore, the capacitor 370, the second conductive portion 312, the fourth conductive portion 322 and the insulating plate 340 are accommodated in the capacitor case 371. Then, the capacitor case 371 is filled with the coating resin 375 to fix the second conductive portion 312, the fourth conductive portion 322, the insulating plate 340, and the capacitor 370 to the capacitor case 371.

Thereby, the insulating plate 340 is fixed to the first power supply busbar 310 and the second power supply busbar 320. A relative positional displacement between the second conductive portion 312 and the fourth conductive portion 322 is easily suppressed. It is possible to easily suppress relative displacements among the collector terminals 353 and the emitter terminals 354 connected to the second conductive portion 312 and the fourth conductive portion 322 and the second conductive portion 312 and the fourth conductive portion 322.

As described above, the positioning pin 1100 is placed to pass through the positioning hole 313 and the first concaved portion 343 after arranging the second conductive portion 312 on the insulating plate upper surface 340a of the insulating plate 340 so that the positioning hole 313 and the first concaved portion 343 communicate with each other in the z-direction. This regulates the position of the first power supply busbar 310 with respect to the insulating plate 340 in the x-direction and the y-direction. Further, it is possible to suppress movement of the sight during an assembling work by placing the positioning pin 1100 to pass through a hole which is formed by communicating the positioning hole 313 and the first concaved portion 343 with each other. Workability is improved.

As described above, the first concaved portion 343 is intentionally formed in a cylindrically concaved manner from the insulating plate upper surface 340a toward the insulating plate lower surface 340b within an area where the first protrusion 341 is imaginary projected onto the insulating plate 340 in the z-direction. Similarly, a second concaved portion 344 is intentionally formed in a cylindrically concaved manner from the insulating plate upper surface 340a toward the insulating plate lower surface 340b within an area where the second protrusion 342 is imaginary projected onto the insulating plate 340 in the z-direction.

Therefore, local thinning of the insulating plate 340 in the z-direction is suppressed. As a result, the insulating plate 340 is suppressed from locally accumulating heat. Deformation of the insulating plate 340 is easily suppressed. The insulating plate 340 is easily placed on the jig 1000.

As described above, the first protrusion 341 exposed from the first fixing hole 323 is inserted into the recessed hole 383 of the first extension portion 382. Specifically, the second protrusion 342 exposed from the second fixing hole 324 is inserted into the recessed hole 383 of the second extension portion.

Thereby, the electrical product 301 is fixed to the first extension portion 382 and the second extension portion respectively. Therefore, relative positional deviation among the electrical product 301 and the power modules 369 are easily suppressed. It is possible to easily suppress relative positional deviations among the terminals of the power supply busbar comprising the first terminals 315 and the second terminals 329 and the terminals of the power modules 369 comprising the collector terminals 353 to be connected to the first terminals 315 and the emitter terminals 354 to be connected to the second terminals 329. This makes it easier to suppress poor connection between the capacitor 370 and the switch modules 368.

As described above, the first extension portion 382 is provided between the power module 369 and the capacitor case 371 in the y-direction. The first extension portion 382 is aligned to face the power module 369 and the capacitor 370 in the y-direction. The second extension portion is also provided between the power module 369 and the capacitor case 371 in the y-direction. The second extension portion is aligned in the y-direction to face the power module 369 and the capacitor 370. Therefore, mutual thermal interference between the power module 369 and the capacitor 370 is easily suppressed by the first extension portion 382 and the second extension portion.

As described so far, the three first terminals 315 are aligned to be spaced apart from the positioning hole 313 described above in the y-direction. The positioning hole 313 is located between the first terminal 315 located closest to the second side wall 392 among the three first terminals 315 and the adjacent first terminal 315 in the x-direction. The first terminal 315 and the positioning hole 313 are aligned to be spaced apart in the x-direction. The positioning hole 313 is less likely to be arranged on the current path between the capacitor 370 and the power module 369. A decrease in the inductance of the current path between the capacitor 370 and the power modules 369 is easily suppressed.

First Modification

Figure 9:
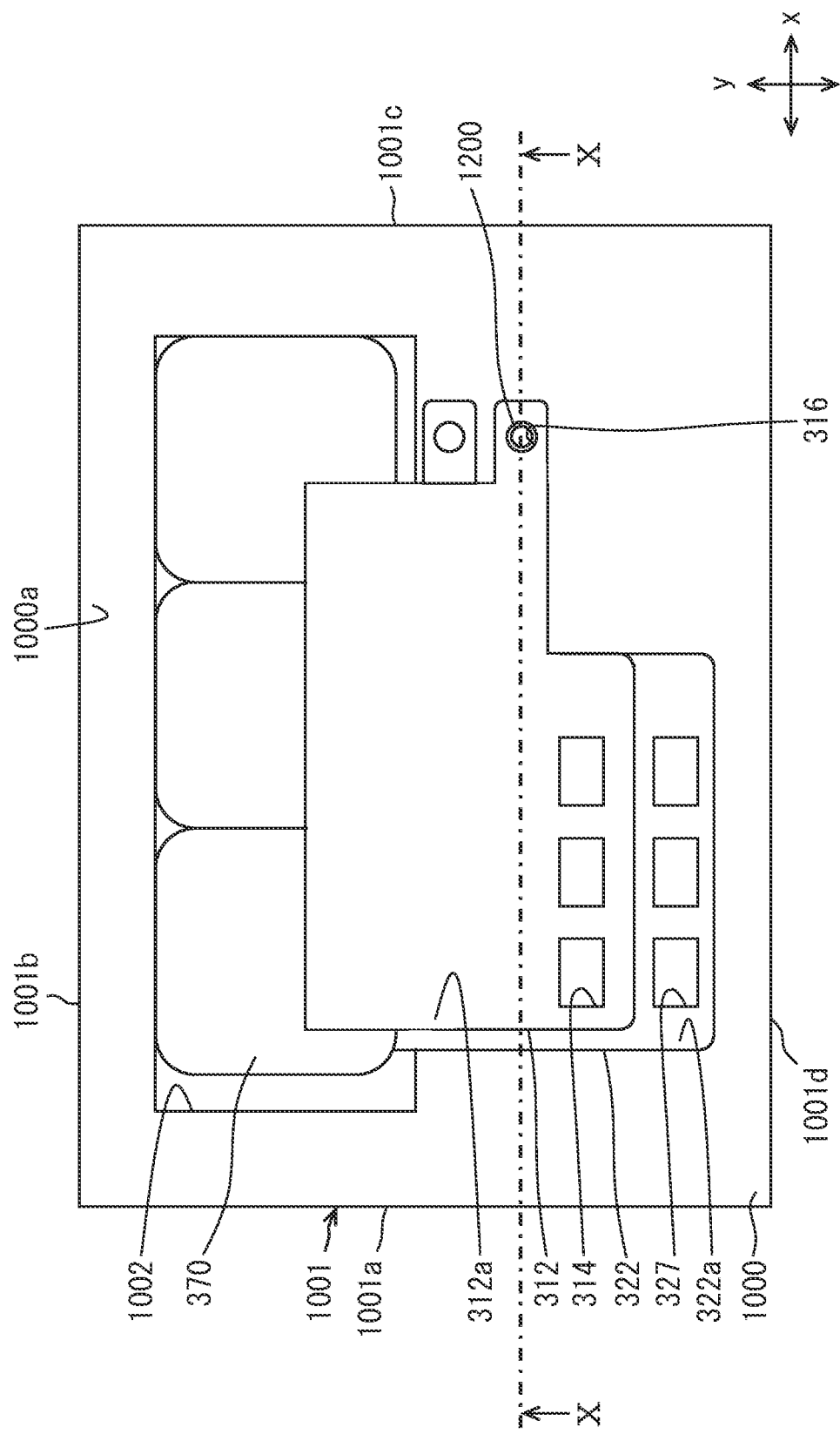
FIG. 9 is a top view for explaining a modified example of a method for manufacturing an electrical product.
Figure 10:
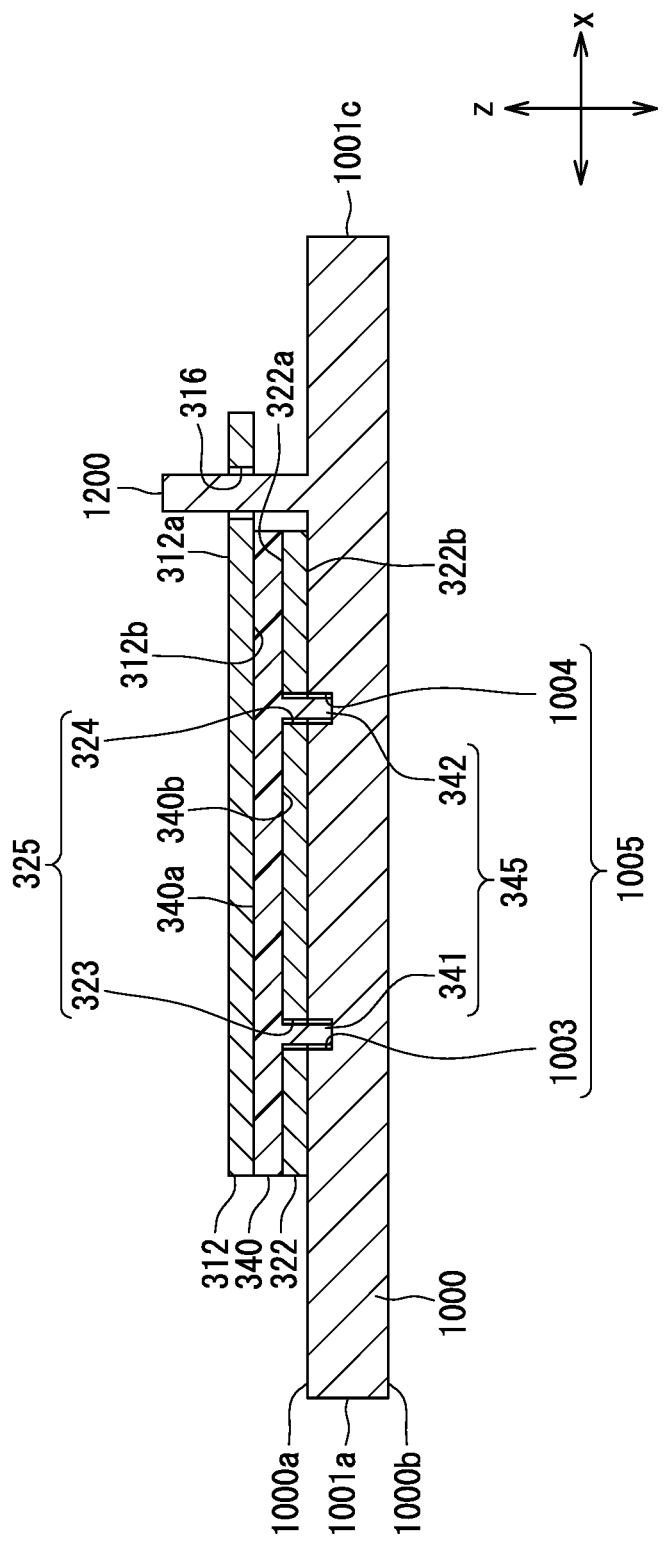
FIG. 10 is a cross-sectional view for explaining a modified example of a method for manufacturing an electrical product along a line X-X shown in FIG. 9.

In the embodiments described so far, a configuration in which the positioning hole 313 is formed in the second conductive portion 312 is described. However, the positioning hole 313 may not be formed in the second conductive portion 312. As shown in FIG. 9 and FIG. 10, the second conductive portion 312 may be provided with fastening holes 316 which open to the first busbar upper surface 312a and the first busbar lower surface 312b and may be used to fasten it to the case 380. The fastening hole 316 corresponds to an adjusting hole.

In that case, it is not necessary to prepare the positioning pin 1100. It is sufficient that the jig 1000 is formed with an extension 1200 extending in a manner away from the upper surface 1000a in the z-direction. Note that the extension portion 1200 may not be formed on the jig 1000. The extension portion 1200 only needs to be connected to the jig 1000. The extension portion 1200 may be inserted into the fastening hole 316 to regulate the position of the second conductive portion 312 in the x-direction and the y-direction.

Second Modification

In the embodiments described so far, the second conductive portion 312 is connected to one electrode of the capacitor 370 and the fourth conductive portion 322 is connected to the other electrode of the capacitor 370. However, the second conductive portion 312 may not be connected to one electrode of the capacitor 370. The fourth conductive portion 322 may not be connected to the other electrode of the capacitor 370.

The fourth conductive portion 322 may be connected to the one electrode of the capacitor 370. The second conductive portion 312 may be connected to the other electrode of the capacitor 370. In that case, the positioning hole 313 and the first through hole 314 are formed in the fourth conductive portion 322. The fixing hole 325, the second through hole 327 and the third through hole 328 are formed in the second conductive portion 312.

Other Modifications

In this embodiment, an example in which the electrical apparatus 300 is included in the in-vehicle system 100 for an electric vehicle is shown. However, the application of the electrical apparatus 300 is not particularly limited to the above example. For example, a configuration in which the electrical apparatus 300 is included in a system of a hybrid vehicle having a motor 400 and an internal combustion engine may also be adopted.

In this embodiment, an example in which one motor 400 is connected to the electrical apparatus 300 is shown. Alternatively, a configuration in which a plurality of motors 400 are connected to the electrical apparatus 300 may also be adopted. In this case, the electrical apparatus 300 has a plurality of three-phase switch modules 368 for configuring the inverter.

What is claimed is:

1. An electrical product accommodated in a case together with a switch component including a plurality of switches, the electrical product comprising:
   an electrical component;
   a first power supply member and a second power supply member connecting the electrical component and the switch component and extending in one direction; and
   an insulating plate provided between the first power supply member and the second power supply member in an orthogonal direction orthogonal to the one direction, wherein
   the first power supply member is formed with a fixing hole which penetrates a first power supply upper surface on a front side of the first power supply member and a first power supply lower surface on a back side of the first power supply member in the orthogonal direction, and wherein
   the insulating plate is formed with a protrusion which extends in the orthogonal direction and is inserted into the fixing hole, and wherein
   a distal end of the protrusion passes through the fixing hole and is inserted into a recessed hole formed in the case to be recessed in the orthogonal direction.

2. The electrical product according to claim 1, wherein
   the case has a bottom, a sidewall annularly joined to the bottom, and an extension portion extending in the orthogonal direction from a side surface of the bottom where the sidewall is joined, and wherein
   the recessed hole is formed on a side of the extension portion spaced apart from the bottom.

3. The electrical product according to claim 2, wherein
   the extension portion face the electrical component and the switch component in the one direction, respectively.

4. The electrical product according to claim 1, wherein
   the second power supply member has an external connection terminal connected to the switch component, and a positioning hole which penetrates a second power supply upper surface on a front side of the second power supply member and a second power supply lower surface on a back side of the second power supply member in the orthogonal direction and regulates a position in a direction perpendicular to the orthogonal direction, and wherein
   the positioning hole is spaced apart from the external connection terminal in an aligning direction perpendicular to each of the one direction and the orthogonal direction.

* * * * *